United States Patent [19]

Kaufhold et al.

[11] 3,727,862

[45] Apr. 17, 1973

[54] AIRCRAFT POWER-UNIT SUSPENSION SYSTEM

[75] Inventors: Norbert Kaufhold, Bremen-Burg; Klaus Konig, Lilienthal; Heinrich Keller, Bremen, all of Germany; Jan G. de Graaf, Zwanenburg, Netherlands; Jan Johan Blankenzee; Hans Bakker, both of Amstelveen, Netherlands; Carolus Plettenburg, Risjsenhout, Netherlands

[73] Assignee: Vereinigte Flugtechnische Werke-Fokker GmbH, Bremen, Germany

[22] Filed: Nov. 30, 1970

[21] Appl. No.: 93,737

[30] Foreign Application Priority Data

Nov. 29, 1969 Germany..................P 19 60 005.6

[52] U.S. Cl..................................244/54, 248/5
[51] Int. Cl. ............................................B64b 1/24
[58] Field of Search ..........................244/54; 248/5

[56] References Cited

UNITED STATES PATENTS

| | | | |
|---|---|---|---|
| 3,057,582 | 10/1962 | Kerry | 248/5 X |
| 3,288,404 | 11/1966 | Schmidt et al | 248/5 |
| 2,761,638 | 9/1956 | Getline | 248/5 |

Primary Examiner—Trygve M. Blix
Attorney—Spencer & Kaye

[57] ABSTRACT

A suspension system for an aircraft power unit having a spacer member mounted on the structure of the airframe. Means are provided for mounting the power unit to the spacer member so as to permit the power unit to vibrate predominantly in one predetermined direction and avoid resonance between the power unit and the airframe structure. The mounting means includes an elastic member such as a torsion bar arranged between and connected to the spacer member and the power unit.

5 Claims, 6 Drawing Figures

PATENTED APR 17 1973 3,727,862

INVENTORS.
NORBERT KAUFHOLD
KLAUS KÖNIG
HEINRICH KELLER
JAN G. de GRAAF
JAN JOHAN BLANKENZEE
HANS BAKKER
CAROLUS PLETTENBURG

BY Spencer & Kaye
ATTORNEYS.

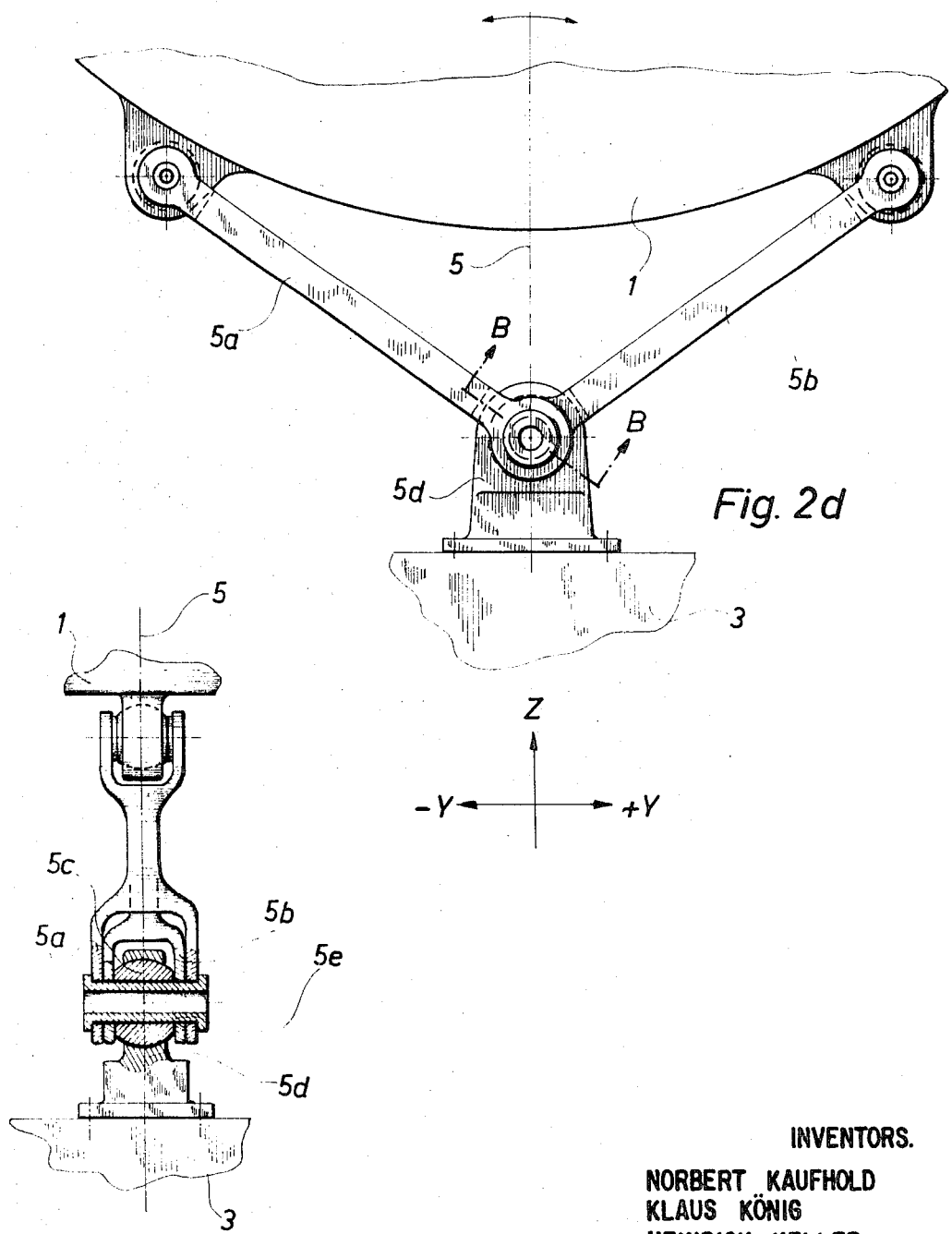

AIRCRAFT POWER-UNIT SUSPENSION SYSTEM

BACKGROUND OF THE INVENTION

1. Field of the Invention

The present invention relates to a suspension system for an aircraft power unit and has means for avoiding resonance between the power unit and the airframe structure. This suspension system is particularly intended for power units which are fastened to the aircraft structure by means of spacers, and preferably for units arranged above the wing assembly.

2. Description of the Prior Art

Several techniques are known for fastening power units to present-day aircraft: the most common being the arrangement of the power units at the wings and at the tail. In these techniques, the power units are fastened to the airframe structure with the aid of a spacer member — which is commonly called a pylon or power unit stem. Due to the spring stiffness of the spacer and the airframe structure, and due to the masses of the power unit and airframe structure, vibrations may occur between the power unit and the airframe structure, or components thereof. In the most undesirable case, the power unit and airframe structure — for example, the wing — vibrate in resonance. It is known that in such a case the developing mechanical stresses will exceed the permissible strengths of the individual components. Suitable measures must then be employed to attempt to avoid vibrations in the resonance range and, thus, unduly high mechanical stresses.

Various techniques are known in the aircraft industry to prevent resonance phenomena between an airframe structure and a power unit. In these known devices — as disclosed in, for example, German Offenlegungsschriften ("laid-open" patent applications) Nos. 1,456,139 and 1,456,154, and in German Patent No. 901,260 — the power units are elastically mounted with respect to the airframe structure. The elements employed for this particular purpose are known as "-vibration dampening connectors". The elastic force transmission means provided in the above-mentioned publications is an elastomer which, in a vibratory sense, acts as a spring as well as a damping means. These elements are extraordinarily suited, however, to absorb high frequency vibrations — that is, vibrations in the sonic range. It is, therefore, most often their purpose to isolate from the airframe structure structural vibrations and other vibrations originating in the power unit which could excite the airframe components into vibrations. Thus, these known devices are a means for avoiding resonance by utilizing the elastic and damping properties of rubber or similar materials.

Such elastomeric spring and damping members are, however, little suited to transmit vibrations at frequencies below the sonic range, because the frequencies in the infrasonic range require longer spring paths. Longer spring paths require more space in the design of the springs and, thus, more undesirable weight in the aircraft. Moreover, the temperatures are very high in the proximity of a power unit, which would seem to preclude advantageous use of an elastomeric material. Finally, the life time of rubber or similar materials, with reference to their elasticity and stability, is relatively short.

SUMMARY OF THE INVENTION

It is, therefore, an object of the present invention to eliminate resonance between the power unit and the airframe structure in order to reduce the unduly high mechanical stresses on the structural components to a permissible limit. This is accomplished according to the present invention by an elastic member which is operative between the power unit and the spacer and which permits vibrations of the power unit to be predominantly uni-directional.

It is known that resonance phenomena in a mechanical vibratory system whose natural frequencies are determined by masses and spring stiffnesses can be eliminated by a change in the latter values. Since, however, in the development of aircraft, a change in the masses of the power unit and airframe structure, and a change in the spring stiffnesses of the spacers and, for example, the bending stiffness of the wing, can not be made due to existing aerodynamic and constructive requirements, this type of tuning off resonance can not be used. Therefore, the insertion, according to the present invention, of an elastic member signifies a particular advantage: the masses or weights, respectively, need not be changed, and the existing spring stiffnesses — that is, those of the entire airframe structure — remain unchanged. A further advantage of the present invention is that the elastic member can be exchanged, if required, in a very simple manner; that is, the spring stiffness of the spacer is adjustable. If, for example, the aircraft is to be equipped with a stronger — that is, heavier — power unit, changes would be required in the dimensions of the airframe; that is, in the spring stiffnesses thereof. In order to meet this requirement, the elastic member need only be removed from the power unit suspension system according to the present invention and the respective spring element — for example, a torsion bar — exchanged for another such element having a different stiffness.

BRIEF DESCRIPTION OF THE DRAWINGS

FIG. 2b is a fragmentary front elevation detail view, partly in cross section, taken generally along the line A—A of FIG. 2a.

FIG. 2c is a fragmentary side elevation detail view, partly in cross section taken generally along line B—B of FIG. 2d, showing another portion of a suspension system according to the present invention.

FIG. 2d is a fragmentary front elevation view of the portion of a suspension system according to the present invention shown in FIG. 2c.

DESCRIPTION OF THE PREFERRED EMBODIMENTS

Figure 1:
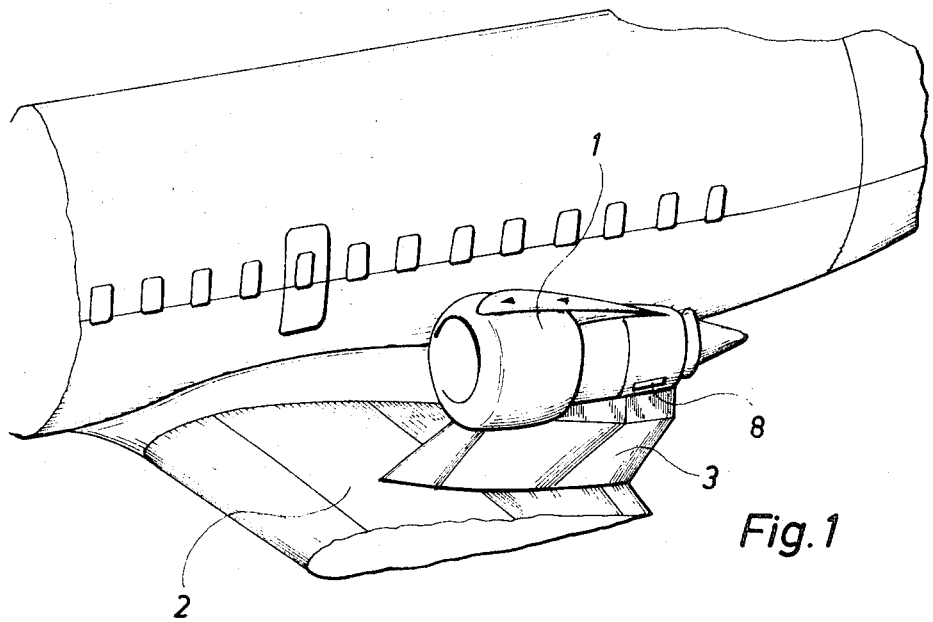
FIG. 1 is a schematic, fragmentary, perspective view of an aircraft having a power-unit suspension system according to the present invention.

Referring first to FIG. 1 of the drawings, a conventional power unit 1, such as a nacelled jet engine, is fastened to a wing 2 of an aircraft by means of a spacer member 3. Member 3 is commonly called a pylon or a power unit stem, as well as a spacer. The shaded area 8 of FIG. 1 indicates the approximate position of an elastic member 7 (FIG. 2).

Figure 2:
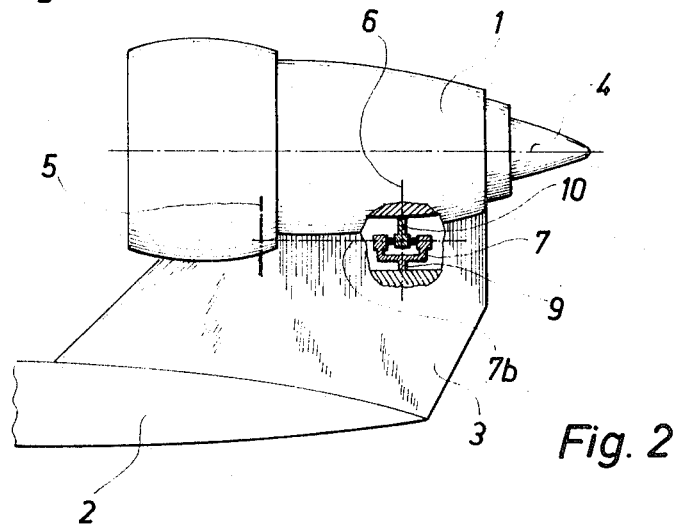
FIG. 2 is a schematic, fragmentary, side elevation view, partly cutaway, showing a wing section having a power-unit mounted thereon by the suspension system according to the present invention.

Referring now to FIG. 2 of the drawings, the power unit 1 is substantially suspended from the spacer member 3 at two points marked by axis lines 5 and 6, respectively. The spacer member 3 is firmly connected in a known manner to the structure of, for example, wing 2.

The elastic member 7, which may include a torsion bar, is arranged so as to be substantially parallel to the engine center line 4 of the power unit 1. The torsion bar 7a is attached to the spacer member 3 by a fork 9 and is attached to the power unit 1 by means of an arm 10 which is arranged in the center of the torsion bar.

Axis 5 of FIG. 2 of the drawings schematically designates the position at which power unit 1 is mounted to spacer member 3.

Figure 2A:
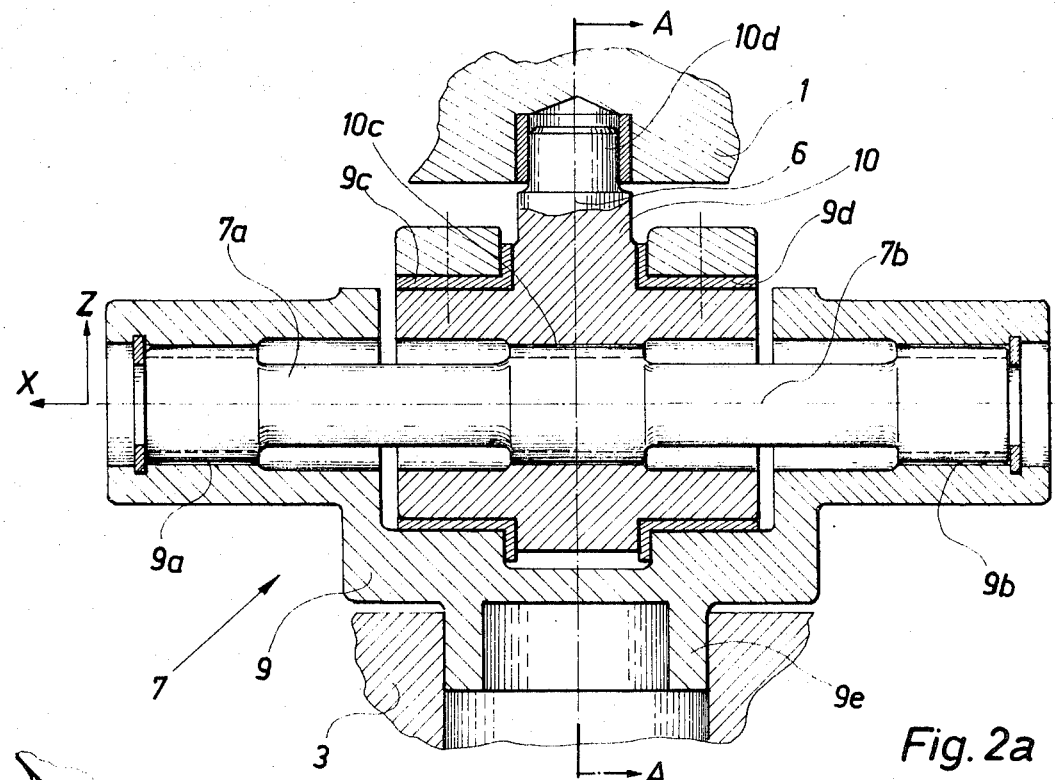
FIG. 2a is a fragmentary cross-sectional, side elevational detail view of a portion of the suspension system according to the present invention.
Figure 2B:
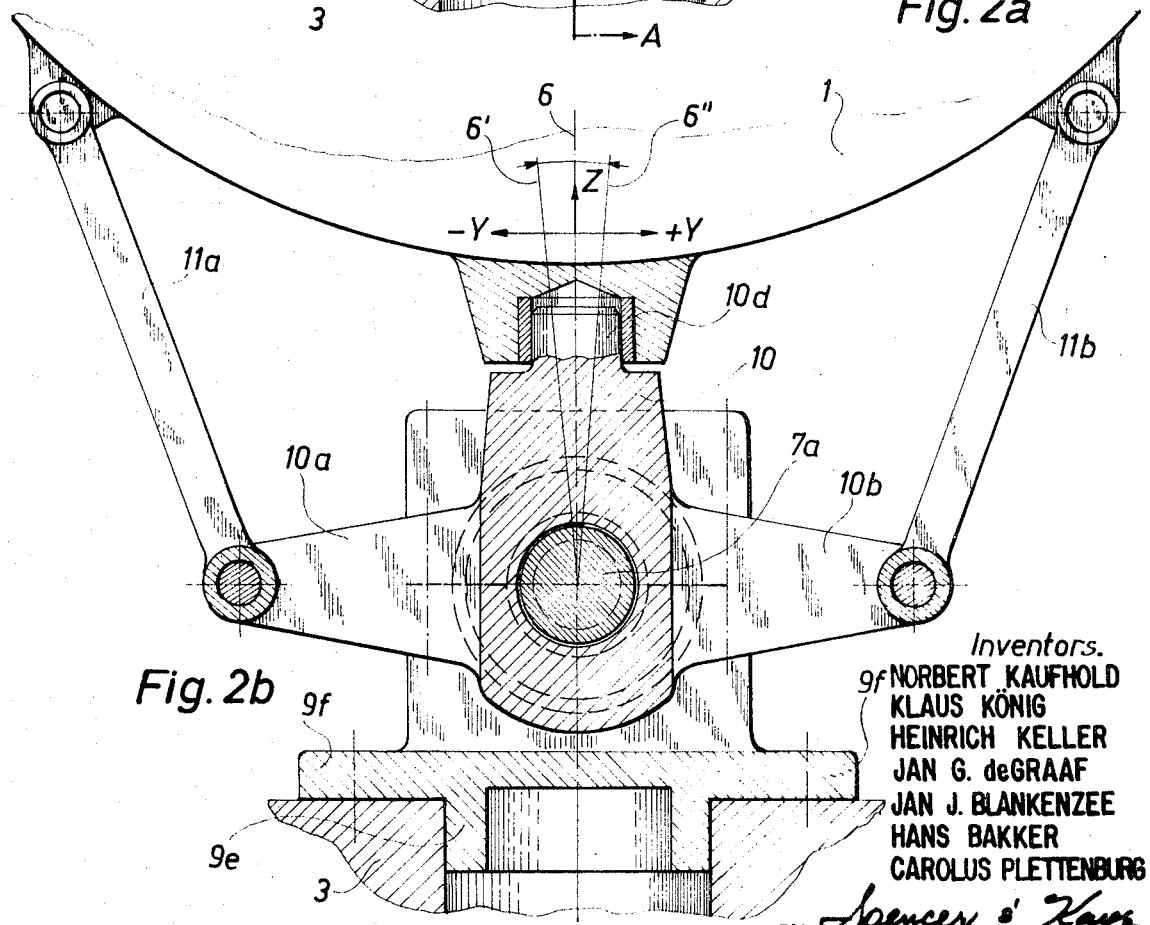

FIGS. 2a and 2b show details of the rear mounting 6 for mounting engine 1 to spacer member 3 by means of elastic member 7. In particular, FIGS. 2a and 2b show the manner in which torsion bar 7a is fastened to engine 1 and spacer member 3. FIG. 2a is a fragmentary cross-sectional side elevation detail view taken in a vertical plane passing generally through elastic member 7 and engine center line 4 (not shown in FIG. 2a). FIG. 2b is a fragmentary front elevation detail view, partly in cross section taken generally through elastic member 7 along line A—A of FIG. 2a. Torsion bar 7a is splined at both of its ends 9a, 9b. In this manner, a fast connection between torsion bar 7a and fork 9 is accomplished. Fork member 9 itself may be mounted to spacer 3 by a hollow pivot 9e (FIG. 2a) which is transmitting forces in the − X − Y directions. The fork member 9 may also be mounted to spacer 3, as shown in FIG. 2b, by means of a flange 9f and screws.

Torsion bar 7a is also splined in its middle portion 10c, and is in this way connected with an arm 10. Fork member 9 is provided with two bearings 9c, 9d by which arm 10 is supported. Thus, an angular movement of arm 10 around axis 7b of torsion bar 7a is facilitated and, furthermore, bending stresses on the torsion bar 7a are avoided. Arm 10 is connected with engine 1 at three points: the pivot 10d and two rods 11a and 11b. Rods 11a and 11b are each fastened to arm 10 by levers 10a and 10b, respectively (FIG. 2b). Because of the engine mounting just described having, in particular, an elastic member 7 according to the present invention, engine 1 is able to make angular movements which are indicated by lines 6' and 6" in FIG. 2b of the drawings.

As indicated in FIG. 2 of the drawings, line 5 marks the position where a front mounting of the engine 1 is placed. FIGS. 2c and 2d of the drawings give, respectively, a detailed cross-sectional and a front elevational view of this front mounting. As shown in FIG. 2d, engine 1 is fastened to spacer 3 by two struts 5a and 5b, and a pedestal 5d. Struts 5a and 5b are pivotally connected at one end with engine 1 in a tangential direction, and their other ends are fastened at a common point to pedestal 5d. This common point is a spherical bearing 5c carried by the bearing housing of pedestal 5d. Spherical bearing 5c itself carries in its bore a bearing bolt 5e which is engaged by two fork shaped ends of struts 5a and 5b (FIG. 2c). By means of this spherical bearing 5c, engine 1 is able to make three movements — that is, three rotations about the three axes X, Y, and Z, through the middle point of spherical bearing 5c. On the other hand, forces from engine 1 in the −Z and the −Y directions are transmitted by spherical bearing 5c to spacer 3. Pedestal 5d is mounted to spacer 3 by means of a pivot (not shown), a flange and screws. The arrangement of the power unit 1 on wing 2 represents a mechanical vibratory system which includes the masses of the power unit 1 and the wing 2, and the spring stiffnesses of spacer member 3 and wing 2. If, for example, the tip of wing 2 is excited into bending vibrations by a gust of wind, these movements are transmitted through spacer member 3, which must be considered as a spring without mass in the equivalent mechanical system, to the power unit 1. This unit 1 then vibrates predominantly in the y,−y direction. With the insertion, according to the present invention, of an elastic member 7 between the power unit 1 and the spacer member 3, the resulting spring stiffness of the spacer member is reduced; that is, the entire vibratory system becomes softer. Since the power unit 1 is rotatably mounted at its front suspension 5, the elastic member 7 according to the present invention permits pendulum movements of the power unit 1 about axis 7b.

The power unit 1 shall move predominantly in the above mentioned direction, because in this direction the highest stresses on the structural components of engine and airframe occur.

In this manner, the entire vibratory system is tuned off resonance by the intermediary of an additional spring stiffness. No resonance occurs between power unit 1 and wing assembly 2, and unduly high mechanical stresses on the structural components are avoided.

The design of the elastic member according to the present invention as a torision bar offers the following advantages, particularly when compared with elastomers: the elastic member is not particularly sensitive to thermal stresses; and the torsion bar does not require much space and, thus, meets strict space limitation requirements resulting from the aerodynamic design of the spacers.

It will be understood that the above description of the present invention is susceptible to various modifications, changes and adaptations, and the same are intended to be comprehended within the meaning and range of equivalents of the appended claims.

I claim:

1. A suspension system for an aircraft power unit, comprising, in combination:
   a. a spacer member mounted to the structure of an airframe; and
   b. means including a torsion bar for mounting an aircraft power unit to said spacer member, said torsion bar having an axis which is substantially parallel to the aircraft longitudinal axis and external to the power unit, and being rigidly connected at one point along its length to said spacer member and at a different point along its length to the power unit in such a way that the power unit is permitted to vibrate predominantly in one predetermined direction about said torsion bar axis in order to avoid resonance between the power unit and the airframe structure due to airframe structure vibrations.

2. A suspension system as defined in claim 1, wherein said spacer member is mounted on the upper side of a wing.

3. A suspension system as defined in claim 1, wherein said mounting means additionally has means for rotatably mounting the power unit to said spacer member.

4. A suspension system as defined in claim 3 wherein said mounting means includes a forward and aft mounting; and wherein said aft mounting includes a fork engaging said spacer member, said torsion bar being mounted in said fork, and an arm connecting said power unit to said torsion bar.

5. A suspension system as defined in claim 4, wherein said forward mounting includes means for rotatably mounting said power unit to said spacer member.

* * * * *